United States Patent [19]

Desouza

[11] Patent Number: 5,735,150
[45] Date of Patent: Apr. 7, 1998

[54] VEHICLE ANTI-THEFT DEVICE

[76] Inventor: Richard M. Desouza, 72 Wilclay Ave., Markham, Ontario, Canada, L3S 1R1

[21] Appl. No.: 859,458

[22] Filed: May 20, 1997

[51] Int. Cl.⁶ ..................................................... B60R 25/02
[52] U.S. Cl. ........................... 70/209; 70/226; 74/558; 74/558.5
[58] Field of Search ............................. 70/207, 209, 211, 70/212, 225, 226, 237, 238, 167–169; 74/558, 558.5

[56] References Cited

U.S. PATENT DOCUMENTS 5,092,146  3/1992  Wang ................................. 70/238 X
5,121,617  6/1992  Chen ................................. 70/238 X
5,450,736  9/1995  Volkmar ............................ 70/238 X

FOREIGN PATENT DOCUMENTS 2263455  7/1993  United Kingdom ..................... 70/209

*Primary Examiner*—Lloyd A. Gall

[57] ABSTRACT

A vehicle anti-theft device including an interior locking component adapted for lockable coupling with a periphery of a steering wheel of a vehicle and an exterior component adapted for rotatable coupling with respect to the interior locking component and the steering wheel.

11 Claims, 3 Drawing Sheets

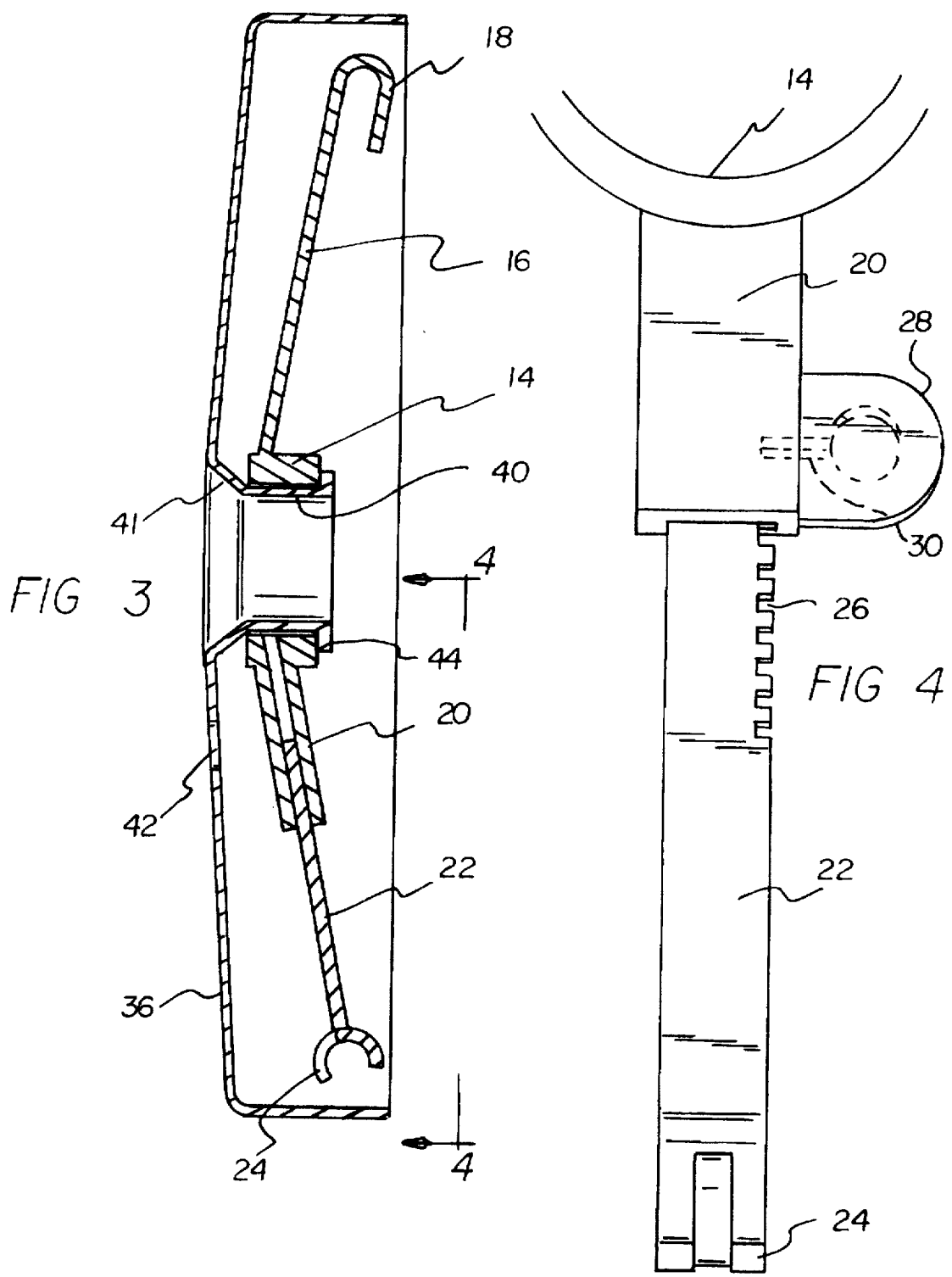

VEHICLE ANTI-THEFT DEVICE

BACKGROUND OF THE INVENTION

1. Field of the Invention

The present invention relates to a vehicle anti-theft device and more particularly pertains to preventing theft of a vehicle and removal of a driver side air bag therefrom with a vehicle anti-theft device.

2. Description of the Prior Art

The use of steering wheel locks is known in the prior art. More specifically, steering wheel locks heretofore devised and utilized for the purpose of impeding theft are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,848,112 to Graber et al. discloses a lockable rotary attachment device. U.S. Pat. No. 5,353,614 to Anderson discloses a vehicle steering-wheel lock. U.S. Pat. No. 5,119,651 to Yang discloses a steering lock with ignition switch blocking means. U.S. Pat. No. 5,347,836 to Chen discloses a configuration of automobile steering wheel locking devices. U.S. Pat. No. 5,207,713 to Park discloses a safety cover for steering wheel. U.S. Pat. No. 3,945,416 to Rim discloses a steering wheel cover.

While these devices fulfill their respective, particular objective and requirements, the aforementioned patents do not describe a vehicle anti-theft device for preventing theft of a vehicle and removal of a driver side air bag therefrom.

In this respect, the vehicle anti-theft device according to the present invention substantially departs from the conventional concepts and designs of the prior art, and in doing so provides an apparatus primarily developed for the purpose of preventing theft of a vehicle and removal of a driver side air bag therefrom.

Therefore, it can be appreciated that there exists a continuing need for new and improved vehicle anti-theft device which can be used for preventing theft of a vehicle and removal of a driver side air bag therefrom. In this regard, the present invention substantially fulfills this need.

SUMMARY OF THE INVENTION

In the view of the foregoing disadvantages inherent in the known types of steering wheel locks now present in the prior art, the present invention provides an improved vehicle anti-theft device. As such, the general purpose of the present invention, which will be described subsequently in greater detail, is to provide a new and improved vehicle anti-theft device and method which has all the advantages of the prior art and none of the disadvantages.

To attain this, the present invention essentially comprises a steering wheel. An interior locking component is adapted for lockable coupling with a periphery of the steering wheel. The interior locking component comprises a central bushing. A pair of fixed arms extend outwardly in an angular orientation from the central bushing. Free ends of the fixed arms have hooked portions dimensioned for engaging the periphery of the steering wheel. The central bushing has a receiving sleeve secured thereto and extending radially therefrom in an angular orientation. The interior locking component includes an adjustable arm slidably received within the receiving sleeve. A free end of the adjustable arm has a U-shaped portion dimensioned for abuttingly receiving an interior surface of the periphery of the steering wheel in a locked orientation. The adjustable arm has a plurality of teeth formed within an interior edge thereof. The interior locking component includes a locking member coupled with a side portion of the receiving sleeve. The locking member has an engaging portion selectively engaging the teeth of the adjustable arm in the locked orientation. The locking member has a key slot therethrough in communication with the engaging portion. An exterior component is adapted for rotatable coupling with respect to the interior locking component and the steering wheel. The exterior component includes a tapered circular portion. The circular portion has a diameter greater than a diameter of the steering wheel. The circular portion has a peripheral rim extending rearwardly therefrom. A boss extends rearwardly from a central point of the circular portion. The boss is rotatably received within the central bushing of the interior locking component. The circular portion has an aperture therethrough offset from the central bushing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle anti-theft device which has all the advantages of the prior art steering wheel locks and none of the disadvantages.

It is another object of the present invention to provide a new and improved vehicle anti-theft device which may be easily and efficiently manufactured and marketed.

It is a further object of the present invention to provide a new and improved vehicle anti-theft device which is of durable and reliable construction.

An even further object of the present invention is to provide a new and improved vehicle anti-theft device which is susceptible of a low cost of manufacture with regard to both materials and labor, and which accordingly is then susceptible of low prices of sale to the consuming public, thereby making such a vehicle anti-theft device economically available to the buying public.

Even still another object of the present invention is to provide a new and improved vehicle anti-theft device for preventing theft of a vehicle and removal of a driver side air bag therefrom.

Lastly, it is an object of the present invention to provide a new and improved vehicle anti-theft device including an interior locking component adapted for lockable coupling with a periphery of a steering wheel of a vehicle and an exterior component adapted for rotatable coupling with respect to the interior locking component and the steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view as taken along line 3—3 of FIG. 2.

FIG. 4 is a rear view of the present invention as taken along line 4—4 of FIG. 3.

The same reference numerals refer to the same parts through the various figures.

DESCRIPTION OF THE PREFERRED EMBODIMENT

Figure 1:
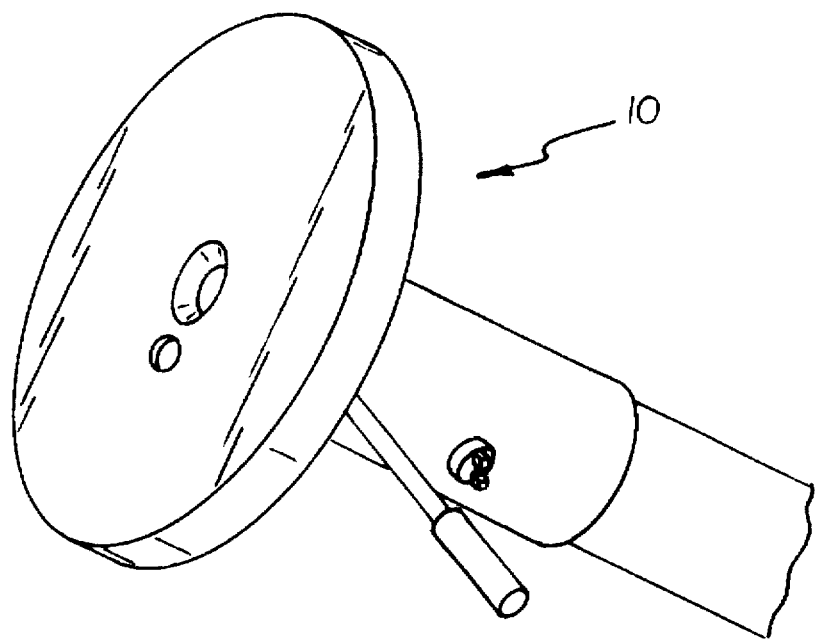
FIG. 1 is a perspective view of the preferred embodiment of the vehicle anti-theft device constructed in accordance with the principles of the present invention.
Figure 2:
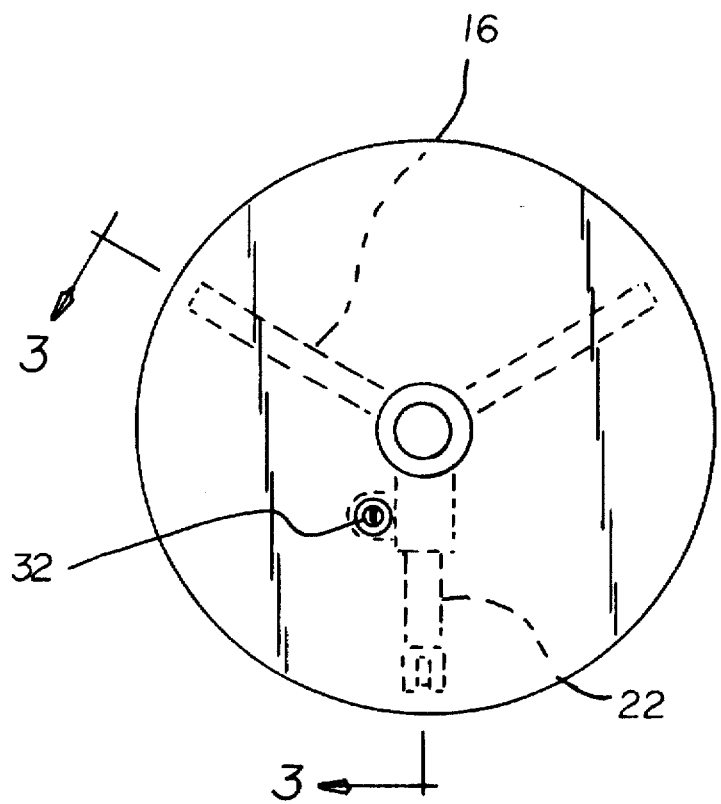
FIG. 2 is a top plan view of the present invention illustrated in FIG. 1.
Figure 5:
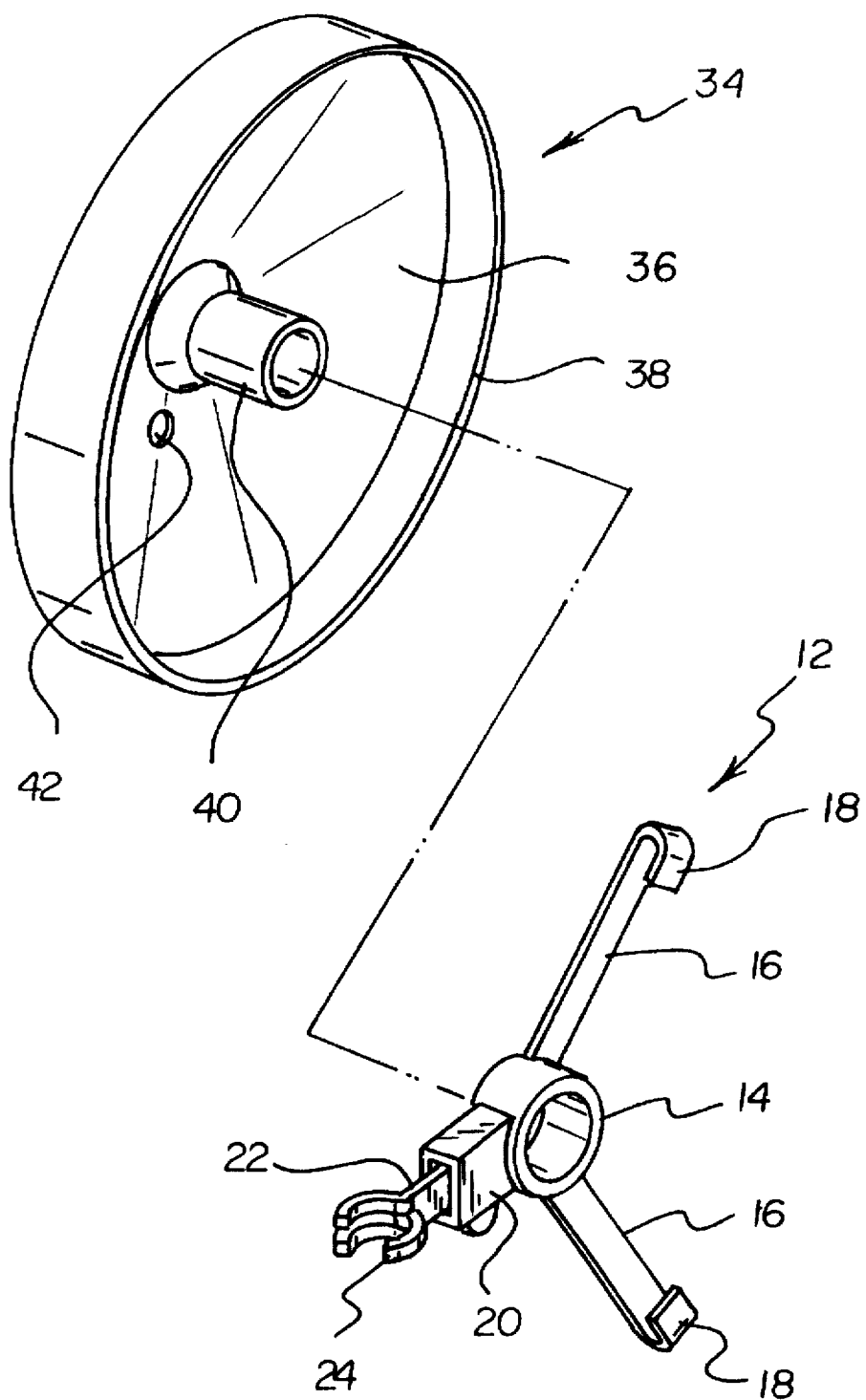
FIG. 5 is an exploded perspective view of the present invention.

With reference now to the drawings, and in particular, to FIGS. 1 through 5 thereof, the preferred embodiment of the new and improved vehicle anti-theft device embodying the principles and concepts of the present invention and generally designated by the reference number 10 will be described.

Specifically, it will be noted in the various Figures that the device relates to a vehicle anti-theft device for preventing theft of a vehicle and removal of a driver side air bag therefrom. In its broadest context, the device consists of an interior locking component and an exterior component. Such components are individually configured and correlated with respect to each other so as to attain the desired objective.

The interior locking component 12 is adapted for lockable coupling with a periphery of the steering wheel. The interior locking component 12 comprises a central bushing 14. A pair of fixed arms 16 extend outwardly in an angular orientation from the central bushing 14. Free ends of the fixed arms 16 have hooked portions 18 dimensioned for engaging the periphery of the steering wheel. The central bushing 14 has a receiving sleeve 20 secured thereto and extending radially therefrom in an angular orientation. The interior locking component 12 includes an adjustable arm 22 slidably received within the receiving sleeve 20. A free end of the adjustable arm 22 has a U-shaped portion 24 dimensioned for abuttingly receiving an interior surface of the periphery of the steering wheel in a locked orientation. The adjustable arm 22 has a plurality of teeth 26 formed within an interior edge thereof. The interior locking component 12 includes a locking member 28 coupled with a side portion of the receiving sleeve 20. The locking member 28 has an engaging portion 30 selectively engaging the teeth 26 of the adjustable arm 22 in the locked orientation. Note FIG. 4o The locking member 28 has a key slot 32 therethrough in communication with the engaging portion 30.

The exterior component 34 is adapted for rotatable coupling with respect to the interior locking component 12 and the steering wheel. The exterior component 34 includes a tapered circular portion 36. The circular portion 36 has a diameter greater than a diameter of the steering wheel. The circular portion 36 has a peripheral rim 38 extending rearwardly therefrom. A boss 40 extends rearwardly from a central point of the circular portion 36. The boss 40 is rotatably received within the central bushing 14 of the interior locking component 12. The boss 40 includes a flared interior portion 41 in communication with a central aperture through the circular portion 36. The circular portion 36 has an aperture 42 therethrough offset from the central bushing. The aperture 42 will align with the key slot 32 to allow for the passage of key thereinto to unlock the device 10 for removal thereof. The boss 40 is secured to the central bushing by a crimping 44. The crimping 44 does not effect the rotation of the device 10. Note FIG. 3.

The present invention is designed as a theft deterrent device for motor vehicles. It features two independent units which lock over the steering wheel to form a safe and secure shield that will prevent theft of the car, as well as protect the driver's side air bag.

The interior locking component 12 is basically a device with three claws which extend outward from the central bushing 14. Two of the claws are stationary, and the third claw is attached upon a spring-loaded mount which allows it to be adjusted in and out in order to grab or release the periphery of the steering wheel.

The exterior component 34 is a shell shaped similar to a Frisbee, with a solid central boss 40 that interconnects with the central bushing 14. The boss and central bushing are preferably locked together in a manner that does not preclude rotation of the exterior component 34.

When locked in position, the exterior component 34 rotates independently of the interior locking component 12 and the steering wheel. Entirely covering the front and side circumference of the steering wheel, it prevents access to and turning of the wheel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle anti-theft device for preventing theft of a vehicle and removal of a driver side air bag therefrom comprising, in combination:

a steering wheel;

an interior locking component adapted for lockable coupling with a periphery of the steering wheel, the interior locking component comprising a central bushing, a pair of fixed arms extend outwardly in an angular orientation from the central bushing, free ends of the fixed arms having hooked portions dimensioned for engaging the periphery of the steering wheel, the central bushing having a receiving sleeve secured thereto and extending radially therefrom in an angular orientation, the interior locking component including an adjustable arm slidably received within the receiving sleeve, a free end of the adjustable arm having a U-shaped portion dimensioned for abuttingly receiving an interior surface of the periphery of the steering wheel in a locked orientation, the adjustable arm having a plurality of teeth formed within an interior edge thereof, the interior locking component including a locking member coupled with a side portion of the receiving sleeve, the locking member having an engaging portion selectively engaging the teeth of the adjustable arm in the locked orientation, the locking member having a key slot therethrough in communication with the engaging portion; and an exterior component adapted for rotatable coupling with respect to the interior locking component and the steering wheel, the exterior component including a tapered circular portion, the circular portion having a diameter greater than a diameter of the steering wheel, the circular portion having a peripheral rim extending rearwardly therefrom, a boss extending rearwardly from a central point of the circular portion, the boss rotatably received within the central bushing of the interior locking component, the circular portion having an aperture therethrough offset from the central bushing.

2. A vehicle anti-theft device comprising:

an interior locking component adapted for lockable coupling with a periphery of a steering wheel of a vehicle; and an exterior component adapted for rotatable coupling with respect to the interior locking component and the steering wheel; wherein the interior locking component comprising a central bushing with a pair of fixed arms and a singular adjustable arm extending outwardly in an angular orientation therefrom.

3. The vehicle anti-theft device as set forth in claim 2 wherein free ends of the fixed arms having hooked portions dimensioned for engaging the periphery of the steering wheel and the adjustable arm having a U-shaped portion dimensioned for abuttingly receiving an interior surface of the periphery of the steering wheel in a locked orientation.

4. The vehicle anti-theft device as set forth in claim 3 wherein the central bushing having a receiving sleeve secured thereto and extending radially therefrom in an angular orientation for receiving the adjustable arm.

5. The vehicle anti-theft device as set forth in claim 4 wherein the adjustable arm having a plurality of teeth formed within an interior edge thereof for being engaged in the locked orientation.

6. The vehicle anti-theft device as set forth in claim 5 wherein the interior locking component including a locking member coupled with a side portion of the receiving sleeve, the locking member having an engaging portion selectively engaging the teeth of the adjustable arm in the locked orientation, the locking member having a key slot therethrough in communication with the engaging portion.

7. The vehicle anti-theft device as set forth in claim 2 wherein the exterior component including a tapered circular portion.

8. The vehicle anti-theft device as set forth in claim 7 wherein the circular portion having a diameter greater than a diameter of the steering wheel.

9. The vehicle anti-theft device as set forth in claim 8 wherein the circular portion having a peripheral rim extending rearwardly therefrom.

10. The vehicle anti-theft device as set forth in claim 9 and further including a boss extending rearwardly from a central point of the circular portion, the boss rotatably received within the central bushing of the interior locking component.

11. The vehicle anti-theft device as set forth in claim 9 wherein the circular portion having an aperture therethrough offset from the central bushing.

* * * * *